Sept. 20, 1971     J. N. SIMPSON ET AL     3,605,116
INDUSTRIAL SPECTACLES
Filed Feb. 27, 1968
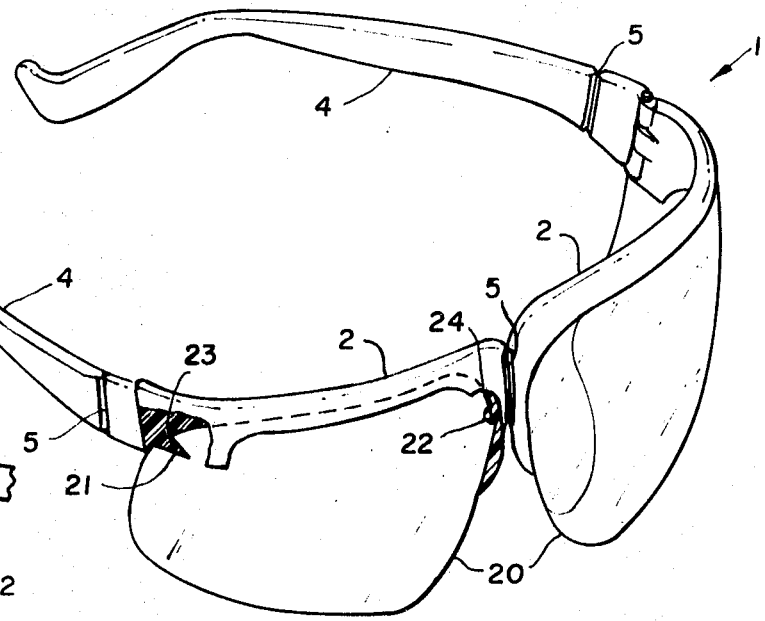
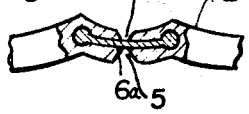
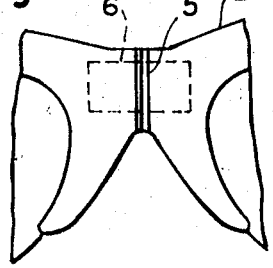
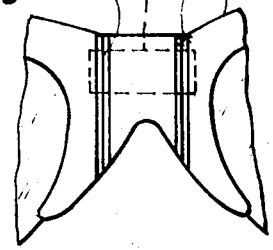
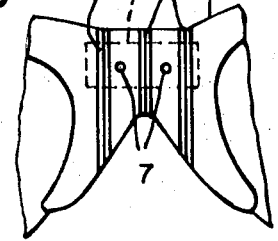
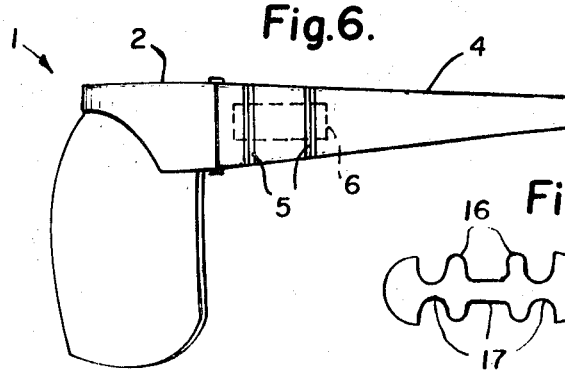
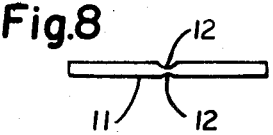
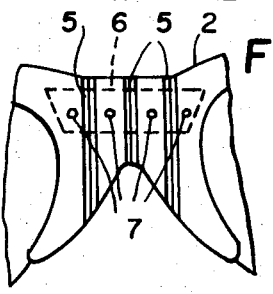
INVENTORS.
JACK N. SIMPSON
GEORGE R. HOFFMASTER
PALMER E. BRACE
BY
*William J. Ruano*
their ATTORNEY

United States Patent Office 3,605,116
Patented Sept. 20, 1971

3,605,116
INDUSTRIAL SPECTACLES
Jack N. Simpson, Sinking Spring, George R. Hoffmaster, Reading, and Palmer E. Brace, Mohnton, Pa., assignors to ESB Incorporated, Philadelphia, Pa.
Filed Feb. 27, 1968, Ser. No. 708,594
Int. Cl. A61f 9/02
U.S. Cl. 2—14R                                           5 Claims

ABSTRACT OF THE DISCLOSURE

Spectacles, such as industrial spectacles and sunglasses, having embedded in the nose piece a malleable insert to permit slight bending, horizontally, with a permanent set of the two lens surrounding portions, either toward or away from the face, so as to adjust the frame to the facial contour of the wearer. Such insert may also be embodied in each temple. The nose piece insert when twisted vertically also permits adjustment of the temple extremities so that they may be brought into horizontal alignment.

---

This invention relates to spectacles and, more particularly, to those of the industrial type and sunglasses, although it is equally applicable to spectacles of all types.

An outstanding disadvantage of commonly used industrial spectacles and sunglasses is that they are not adjustable to the facial contour of the wearer, therefore, the frame may be spaced either too far or too near the face of the wearer for comfort and proper vision.

Another disadvantage is that the extremities of the temples are often out of horizontal alignment and cannot be adjusted to correct this fault. Also, the temples often do not fit comfortably.

An object of this invention is to provide a novel spectacle construction which will overcome the above mentioned disadvantages of conventionally used spectacles and which will enable easy and quick desirable adjustment of the spectacle frame to fit various facial contours and sizes.

A more specific object of this invention is to provide an embedded malleable element in the bridge or nose piece which can assume a desired set when pivotally bent so as to allow adjustment of the angle between the two lenses to more accurately and comfortably fit the frame against the face of the wearer and thus eliminate the necessity of carrying large numbers of different sizes or shapes of spectacles for the workmen.

Another object of the invention is to provide a novel adjustable means for providing horizontal alignment of the tips or extremities of the temples by an easy and quick adjustment at the bridge or nose piece.

Another object of the invention is to provide one or more molded malleable inserts in the temples of a pair of spectacles or sunglasses to permit adjustment and desired set in the adjusted position so as to provide an accurate and comfortable fit of the temples.

Other objects and advantages will become more apparent from a study of the following description taken with the accompanying drawing wherein:

FIG. 1 is a perspective view, with parts shown broken away, of a pair of industrial spectacles embodying the principles of our invention;

FIGS. 2 and 2A are different fragmentary, top views of the nose piece portion of FIG. 1, showing such portion in horizontal cross-section to more clearly illustrate the embedded element therein;

FIG. 3 is a fragmentary, front view of the nose piece portion shown in FIG. 2;

FIG. 4 is a modification of FIG. 3 showing two areas for adjustment instead of one;

FIGS. 5 and 5A are modifications of FIG. 4 showing three areas of adjustment of the nose piece.

FIG. 6 is a side elevational view with the temple portion shown partly broken away and illustrating an embedded malleable element to permit horizontal pivotal adjustment of the temples at two different areas;

FIG. 7 is a front, elevational view of a typical malleable insert for substitution for insert 6 in FIGS. 2 to 5 inclusive;

FIG. 8 is a top view of a modified form of insert;

FIG. 9 is an elevational view;

FIG. 10 is a top view of another modification of the bendable insert; and

FIG. 11 is a front, elevational view of still another modification of the insert.

Referring more particularly to FIG. 1 of the drawing, numeral 1 generally denotes a pair of spectacles, such as used for industrial safety, although the invention may be applied to all types of spectacles, including sunglasses and reading glasses. The spectacles comprise frame portions or rims 2, preferably of nylon, such as Dupont Zytel 101 sold by E. I. du Pont de Nemours of Wilmington, Del., although it should be understood that other nylons as well as other thermoplastic and thermoset materials may be used instead. Plastic lenses 20 are snap-fitted to rims 2 by being notched at 22 and slotted at 21 which snap-fit in corresponding portions 24 and 23, respectively, of the plastic rims 22.

The frame portions 2, 2 comprising integral rim and nose piece portions are joined together solely by a metallic element 6 (or 6a) which is embedded in the nose piece portions and which is of malleable material that can assume a desired set when bent along a vertical axis in either direction. To allow such bending, the confronting nose piece portions of the frame portions or rims 2, 2 are slightly separated and angularly grooved as denoted by numerals 5, 5. Thus by grasping the two frame portions 2, 2 and pivotally bending them along a vertical axis, either away or toward the face of the wearer, the angle between the portions 2, 2 may be adjusted to provide a comfortable fit for any particular facial contour of the wearer. And by twisting the two frame portions vertically about such vertical axis, the ends of the temples may be brought into horizontal alignment if they are out of such alignment.

The embedded insert 6 may be either flush at its top surface with the top surface of the frame so as to be exposed to view, or it may be totally embedded in the nose piece, as shown in FIG. 3. A suitable material for the embedded plate or thin strip forming insert 6 is a stainless steel, Type 304 of about .30 to .040 inch thick which is dead soft, bright annealed and deburred. However, other suitable materials, even non-metallic materials, which are malleable and can be bent to a desired angle and which the material assumes a desired set may be used instead, such as beryllium copper and other alloys in the temper ranges which can take and hold a set.

As will appear more clearly in FIGS. 2, 2A and 3 the embedded insert 6 may be bent along a central vertical axis to any desired angle, either towards or away from the face of the wearer.

FIG. 4 shows a modification in which two instead of one vertical bendable area is provided, namely, 5, 5 disposed at the ends of the nose piece portions.

FIGS. 5 and 5A show further modifications wherein three vertical bendable areas, 5, 5, 5 are provided to give an even greater range of adjustment and wherein pins 7 are provided which extend through holes in the insert 6 (such as holes 10 in FIG. 7) for securely holding the insert in place in the plastic frame.

FIG. 6 shows a similar insert 6 embedded in each temple 4 and illustrating two bendable areas or grooves 5, 5 for each temple, although it should be understood that a single bendable area may be used instead, such as illustrated in FIG. 1. V-shaped grooves 5 such as shown in FIGS. 2 and 3 may also be used on the temples. It will be further understood that the insert and accompanying grooves may be positioned centrally instead of forwardly of the temples or even near the extremities, also that a plurality of such inserts and grooves may be used in a plurality of locations of each temple to provide a wider range of adjustment.

FIG. 7 shows a desired shape of the insert 8, which may be used in place of insert 6, and which includes sinusoidal portions 9 and holes 10, the latter for receiving pins 7 as shown in FIG. 5 extending to the outside surfaces of the nose piece. Additional holes 10 may be provided if desired for the plastic to flow through and hold the insert in the frame. Rivets may be extended through holes 10.

Insert 8 may be of uniform thickness, such as of the order of .20 to .040 inch, or may be of greater thickness, such as illustrated in insert 11 of FIG. 8 with a reduced central thickness at 12, 12 to facilitate bending along a defined weakened vertical line.

FIGS. 9 and 10 are front and top views of a still further modification of the insert 13 having sinusodial bends 14 or corrugations.

FIG. 11 shows a still further modification of the insert in the form of wire with curved sides 16, projections 16 and cut-outs 17.

It will be understood that other shapes of inserts may be used instead, either with or without holes. It should be further understood that in some cases the insert 6, such as shown in FIG. 2, may be of spring metal instead so as to always spring back to a predetermined angular relationship between the frame portions 2, 2.

Also, it should be noted that in the event the frame portions 2, 2 of FIG. 1 are of malleable metal, instead of plastic material, weakened portion 5 of reduced thickness defined by angularly disposed surfaces may be provided so as to be readily bendable with a desired set. Also the various modifications shown in FIGS. 2 to 6 inclusive may be applied similarly to metal frames and metal temples.

Thus it will be seen that we have provided a highly efficient and relatively simple and inexpensive spectacle construction which enables easy and quick permanent adjustment of the frame so that the eye surrounding portions or rims may be bent inwardly or outwardly to a suitable angular relationship to suit various face contours; also, we have provided a novel embedded malleable insert in the center or other portion of the nose piece which enables twisting in a vertical plane to correct non-horizontal alignment of the ends of the temples; furthermore, we have provided one or more malleable inserts for embedding in the temples to permit bending with a permanent set at one or more locations on each temple.

While we have illustrated and described several embodiments of our invention, it will be understood that these are by way of illustration only, and that various changes and modifications may be made within the contemplation of our invention and within the scope of the following claims.

We claim:

1. In a pair of spectacles, a frame including two separate rim portions of plastic material, and an inert of non-flexible, thin malleable material which can assume a desired set when pivotally bent and which insert is embedded in said portions and constituting the sole means for joining them together, whereby said rim portions may be bent to a desired permanent angular relationship.

2. Spectacles as recited in claim 1 wherein said rim portions include nose piece portions provided with angular slots forwardly and rearwardly of the frame portion to facilitate angular bending of said rim portions either toward or away from the face of the wearer.

3. Spectacles as recited in claim 2 wherein said nose piece portions include a second portion of reduced cross-section joined by said malleable insert to enable bending with a desired set at two locations.

4. Spectacles as recited in claim 2 wherein said nose piece portions of the frame include three vertically and angularly grooved portions arranged in spaced parallel relationship through which extends said embedded malleable insert to provide bending at three separate locations.

5. In a pair of spectacles, a temple including a forward portion and a separate rearward portion, a malleable insert of non-flexible material which can assume a desired set when pivotally bent and which is embedded in and constituting the sole connecting means between said forward and rear portion.

References Cited

UNITED STATES PATENTS

| 1,779,155 | 10/1930 | Baker | 2—14(.11) |
| 3,052,160 | 9/1962 | Ratti | 351—114X |

FOREIGN PATENTS

| 798,331 | 3/1936 | France. |
| 669,626 | 12/1938 | Germany. |
| 556,319 | 2/1957 | Italy. |

OTHER REFERENCES

A.P.C. Application of Ratti; Ser. No. 340,190; published May 4, 1943.

H. HAMPTON HUNTER, Primary Examiner

U.S. Cl. X.R.

351—114